United States Patent
Okanoue et al.

(10) Patent No.: US 7,158,769 B2
(45) Date of Patent: Jan. 2, 2007

(54) DEVICE AND METHOD FOR ALERTING USER TO INTERFERENCE

(75) Inventors: Kazuhiro Okanoue, Minato-ku (JP); Shuntaro Yamazaki, Minato-ku (JP)

(73) Assignee: NEC Corporation, Tokyo (JP)

( * ) Notice: Subject to any disclaimer, the term of this patent is extended or adjusted under 35 U.S.C. 154(b) by 658 days.

(21) Appl. No.: 10/107,393

(22) Filed: Mar. 28, 2002

(65) Prior Publication Data

US 2002/0142744 A1 Oct. 3, 2002

(30) Foreign Application Priority Data

Mar. 28, 2001 (JP) ............... 2001-091558

(51) Int. Cl. *H04B 17/00* (2006.01)

(52) U.S. Cl. ............... 455/226.1; 455/277.2; 455/296; 455/67.11

(58) Field of Classification Search ........... 455/277.2, 455/283, 296, 114.2, 67.13, 67.11, 67.7, 63.1, 455/65, 161.3, 226.1, 226.3
See application file for complete search history.

(56) References Cited

U.S. PATENT DOCUMENTS

| | | | | |
|---|---|---|---|---|
| 4,737,771 | A * | 4/1988 | Coash | 340/539.1 |
| 5,499,388 | A * | 3/1996 | Song | 455/62 |
| 5,603,087 | A * | 2/1997 | Shultz | 455/423 |
| 6,229,997 | B1 * | 5/2001 | Addy | 455/226.1 |
| 2002/0081988 | A1 * | 6/2002 | Parker | 455/296 |
| 2002/0098821 | A1 * | 7/2002 | Struhsaker | 455/305 |

FOREIGN PATENT DOCUMENTS

| | | |
|---|---|---|
| JP | 5-136747 | 6/1993 |
| JP | 7-143090 | 6/1995 |
| JP | 2000-22712 | 1/2000 |

OTHER PUBLICATIONS

"Supplement to IEEE Standard for Information technology- Telecommunications and information exchange between systems- Local and metropolitan area networks- Specific requirements," Part 11: Wireles LAN Medium Access Control (MAC) and Physical Layer (PHY) Specifications, IEEE Std. 11b-1999 (Supplement to ANS1/IEEE Std. 802.11, 1999 Edition, pp. 11-58.
Specification of the Bluetooth System, Specification vol. 1, Version 1.0 B, Dec. 1, 1999, pp. 2-32.
Kamerman et al. "Microwave Oven Interference on Wireless LANs Operating in the 2.4 GHz ISM Band," IEEE, 1997, pp. 1221-1227.

* cited by examiner

*Primary Examiner*—Jean Gelin
*Assistant Examiner*—Sam Bhattacharya
(74) *Attorney, Agent, or Firm*—Young & Thompson (57) ABSTRACT

An alerting device allowing easy estimation of possible interference and useful suggestions to eliminate deteriorated communication quality due to interference is disclosed. A signal including a band used by a target radio communication system is selected from a received signal based on a prescribed system specification of the radio communication system. A detected signal level of the selected signal is detected and compared with the prescribed interference level. When the detected signal level is greater than the prescribed interference level, it is determined that interference occurs. Further, an interference source is estimated by analyzing the selected signal with respect to time and frequency components.

16 Claims, 11 Drawing Sheets

| FREQ.-DOMAIN ANALYSIS RESULT \ TIME-DOMAIN ANALYSIS RESULT | 625 μSEC OR LESS | 625 - 3125 μSEC | 3125 μSEC OR MORE |
|---|---|---|---|
| 1MHz OR LESS | BLUETOOTH™ | BLUETOOTH™ | MICROWAVE OVEN |
| 1 ~ 15MHz | IEEE 802.11b | MICROWAVE OVEN | MICROWAVE OVEN |
| 15MHz OR MORE | IEEE 802.11b | IEEE 802.11b | MICROWAVE OVEN |

DEVICE AND METHOD FOR ALERTING USER TO INTERFERENCE

BACKGROUND OF THE INVENTION

1. Field of the Invention

The present invention relates to interference monitoring techniques and in particular to a technique which alerts a user to deteriorated communication quality caused by occurrence of interference in a radio communication system.

2. Description of the Related Art

In recent years, it has become a common practice to obtain access to the Internet from ordinary households. In order to eliminate the inconvenience and disorder of cabling from a telephone line to information devices within a home, wireless connections for Internet access have received widespread attention.

As such a wireless communication system, the followings are known: Wireless LAN (Local Area Network) conforming to IEEE802.11b standards (e.g. IEEE std 802.11b-1999, Supplement to IEEE Standard for Information technology—Telecommunications and information exchanger between systems—Local and metropolitan area networks Specific requirements—Part 11: wireless LAN Medium Access Control (MAC) and Physical Layer (PHY) specifications: Higher-Speed Physical Layer (PHY) Extension in the 2.4 GHz Band); and Wireless system called "Bluetooth™" which is defined in Specification of the Bluetooth™ System Version 1.0B. These wireless systems are used in the 2.4 GHz band.

In radio communications, quality of communication is frequently affected by the presence of other electric equipment generating radio waves at frequencies in the same band. In order to avoid the effect of interference from such other electric equipment, several techniques have been proposed. In Japanese Patent Application Unexamined Publication No. 07-143090, a received electric field strength is compared with a reference level to produce a level signal and, when the period of high level is longer than the time width of a time slot, an alarm is generated. In Japanese Patent Application Unexamined Publication No. 2000-022712, a channel use state of its own radio communication system is measured for each channel and a channel use state (for example, interference power) of other radio communication system is also measured. When interference is detected, a channel to be used for its own radio communication system is automatically changed.

The above prior arts are designed to decrease the effect of interference when the radio communication system is in operation. In an ordinary household or the like, however, it is preferable to previously check whether interference occurs, and the result is used to design a radio communication system within the household to provide no interference.

In the case where a radio communication system has no interference avoiding technique such as the above prior art implemented therein, it is difficult to handle deteriorated performance problems cause by occurrence of interference. As a result, an expected communication performance cannot be obtained.

In Japanese Patent Application Unexamined Publication No. 05-136747, a directional coupler is connected between a radio transmitted an antenna to detect an unexpected reflected wave, which results in preventing damage to the transmitter and the antenna. In this publication, it is suggested that such technique can be also applied to interference detection. However this conventional technique can be applied to a radio transmitter. Accordingly, possible interference cannot be estimated until such a radio transmitter is possessed.

SUMMARY OF THE INVENTION

An object of the present invention is to provide an alerting device and interference monitoring method allowing easy estimation of possible interference in a radio communication system.

Another object of the present invention is to provide an alerting device and method that can provide suggestions to eliminate deteriorated communication quality due to interference.

According to the present invention, an alerting device for alerting a user to occurrence of interference on a band used in a wireless communication system, includes: a determiner for determining whether an interference source exists, based on system identifying information prescribed in the wireless communication system; and an indicator for indicating that interference occurs on the band when it is determined that the interference source exists.

The determiner may include an interference detector for detecting occurrence of interference based on interference information included in the system identifying information.

Preferably, the determiner may further include an estimator for estimating an interference source from a received signal when the occurrence of interference is detected.

According to an aspect of the present invention, an alerting device for alerting a user to occurrence of interference in a radio communication system, includes: a signal extractor for extracting an interference component from a received signal based on system identifying information prescribed in the radio communication system; an interference detector for detecting whether the interference component deteriorates quality of communication, to produce an interference detection signal; and an indicator for notifying a user of occurrence of interference when the interference detection signal indicates deteriorated quality of communication.

According to another aspect of the present invention, an alerting device for alerting a user to occurrence of interference in a radio communication system, includes: a signal extractor for extracting an interference component from a received signal based on system identifying information prescribed in the radio communication system; an interference detector for detecting whether the interference component deteriorates quality of communication, to produce an interference detection signal; an estimator for estimating an interference source from the interference component when the interference detection signal indicates deteriorated quality of communication; and an indicator for notifying a user of occurrence of interference and the interference source when the interference detection signal indicates deteriorated quality of communication.

According to the present invention, an alerting method for alerting a user to occurrence of interference on a band used in a wireless communication system, includes the steps of: determining whether an interference source exists, based on system identifying information prescribed in the wireless communication system; and indicating that interference occurs on the band when it is determined that the interference source exists.

The determining step may include the step of: detecting occurrence of interference based on interference information included in the system identifying information.

The alerting method preferably further includes the step of: estimating an interference source from a received signal when the occurrence of interference is detected.

As described above, according to the present invention, an interference occurring in the radio communication system is detected based on specification data such as the center frequency and bandwidth of a band used by the radio communication system. When interference occurs, a user is notified by an alert such as sound, light, or vibration.

In addition it is preferable to notify the user of not only the occurrence of interference but also its interference source.

The 2.4 GHz band used as ISM(Industry Science and Medical) band is also used by not only wireless system such as wireless LAN conforming to IEEE802.11b and Bluetooth™ but also microwave ovens used in ordinary households. Accordingly, radio wave interference will increase more and more. Although a specialist in radio communications may easily estimate an interference source causing the interference, it is difficult for ordinary users.

It is possible to estimate influence on a target radio communication system by measuring power on its frequency band based on the center frequency and bandwidth used by the target radio communication system. For ordinary users, it is important to know whether interference occurs and further useful to know what causes the interference.

Envelope level patterns of radiated signals vary by electronic equipment. A signal envelope of a signal radiated by ordinary home-use microwave oven is a pulse-like signal having a width of approximately 20 msec, as indicated in Ad Kamerman, Nedim Erkocevic, "Microwave Oven Interference on Wireless LANs Operating in the 2.4 GHz ISM Band" (IEEE, Personal, Indoor and Mobile Communications, 1997. Waves of the year 2000, PIMRC'97., The 8th IEEE International Symposium on, Volume:3, 1997).

As for Bluetooth™, a signal envelope of a radiated signal varies depending on a length of data to be transmitted. In the case of 1500-byte data, its signal envelope is a pulse-like signal having a width of approximately 1 msec. In the case of IEEE802.11b, the length of a transmission signal is defined to be one of 625 μsec, 625×3 (μsec) and 625×5 (μsec). Accordingly, its envelope of a radiated signal is a pulse-like signal having a width of one of these.

Further, a spectrum of IEEE802.11b has a bandwidth of 20 MHz per channel, a spectrum of Bluetooth™ has a bandwidth of 1 MHz per channel, and a spectrum of home-use microwave oven has a bandwidth of the order of 15 MHz.

Accordingly, it is possible to estimate an interference source by analyzing a frequency band used by a target communication system with respect to pulse length on time axis and spectrum on frequency axis. For example, when a microwave oven is estimated to be an interference source, it is easy for a user in an ordinary household to take an appropriate step, for example, to stop usage of the microwave oven. In this manner, the alerting device according to the present invention allows easy detection of interference in a radio communication system and can suggest what to do so as to avoid deterioration in communication quality cause by interference,

DESCRIPTION OF THE PREFERRED EMBODIMENTS

First Embodiment

Figure 1:
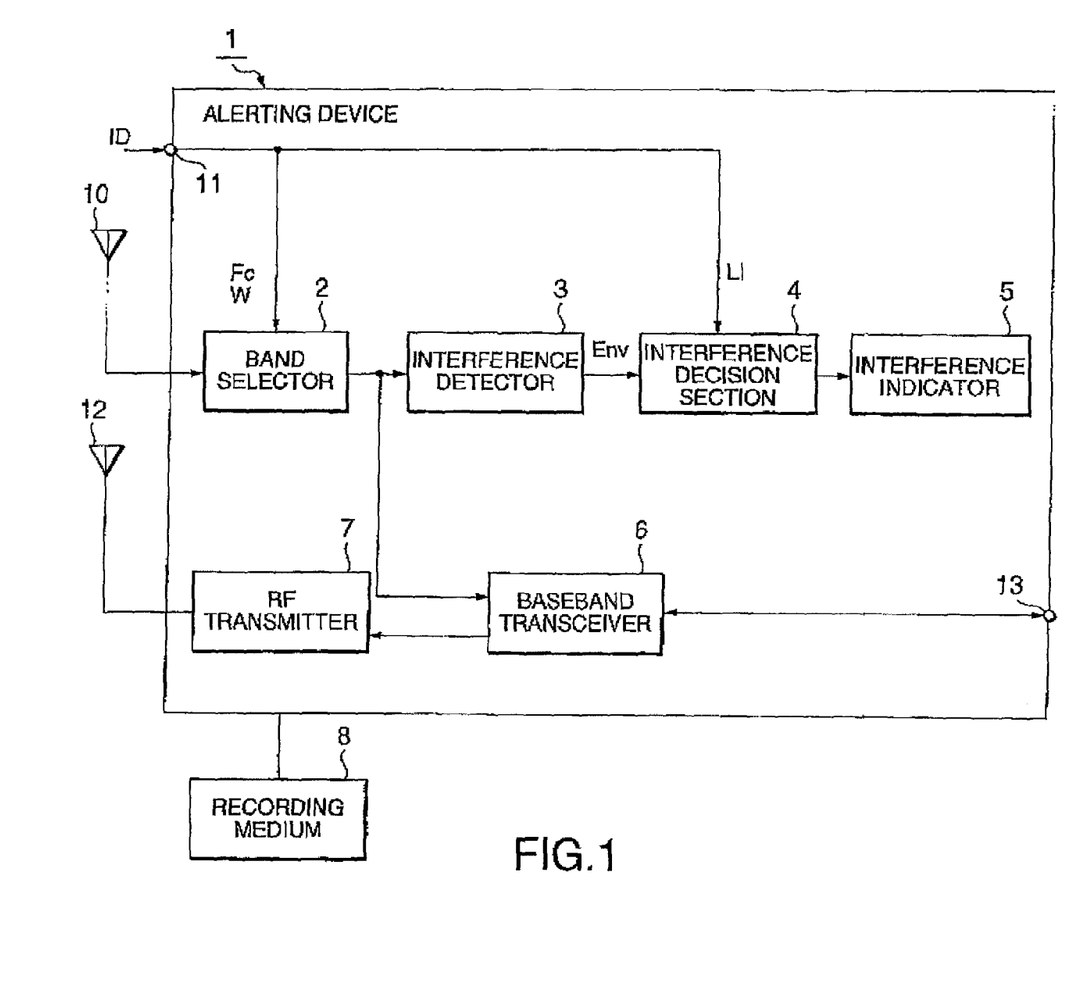
FIG. 1 is block diagram showing an alert generating device according to a first embodiment of the present invention.

Referring to FIG. 1, an alerting device 1 according to a first embodiment of the present invention includes a band selector 2, an interference detector 3, an interference decision section 4, and an interference indicator 5. In this embodiment, the alerting device 1 is further provided with a baseband transceiver 6, a radio-frequency transmitter 7, a recording medium 8, a receiving antenna 10, an input terminal 11, a transmitting antenna 12, and an input/output terminal 13.

The above functions of the alerting device 1 may be implemented with hardware or software. A program-controlled processor (not shown) may be provided in the alerting device 1 to implement the above functions and perform the interference monitoring and alert generating operations by running corresponding programs that are previously stored in the recording medium 8. Hereafter, the interference monitoring and alert generating operations will be described with reference to FIG. 2.

1.1) Operation

Figure 2:
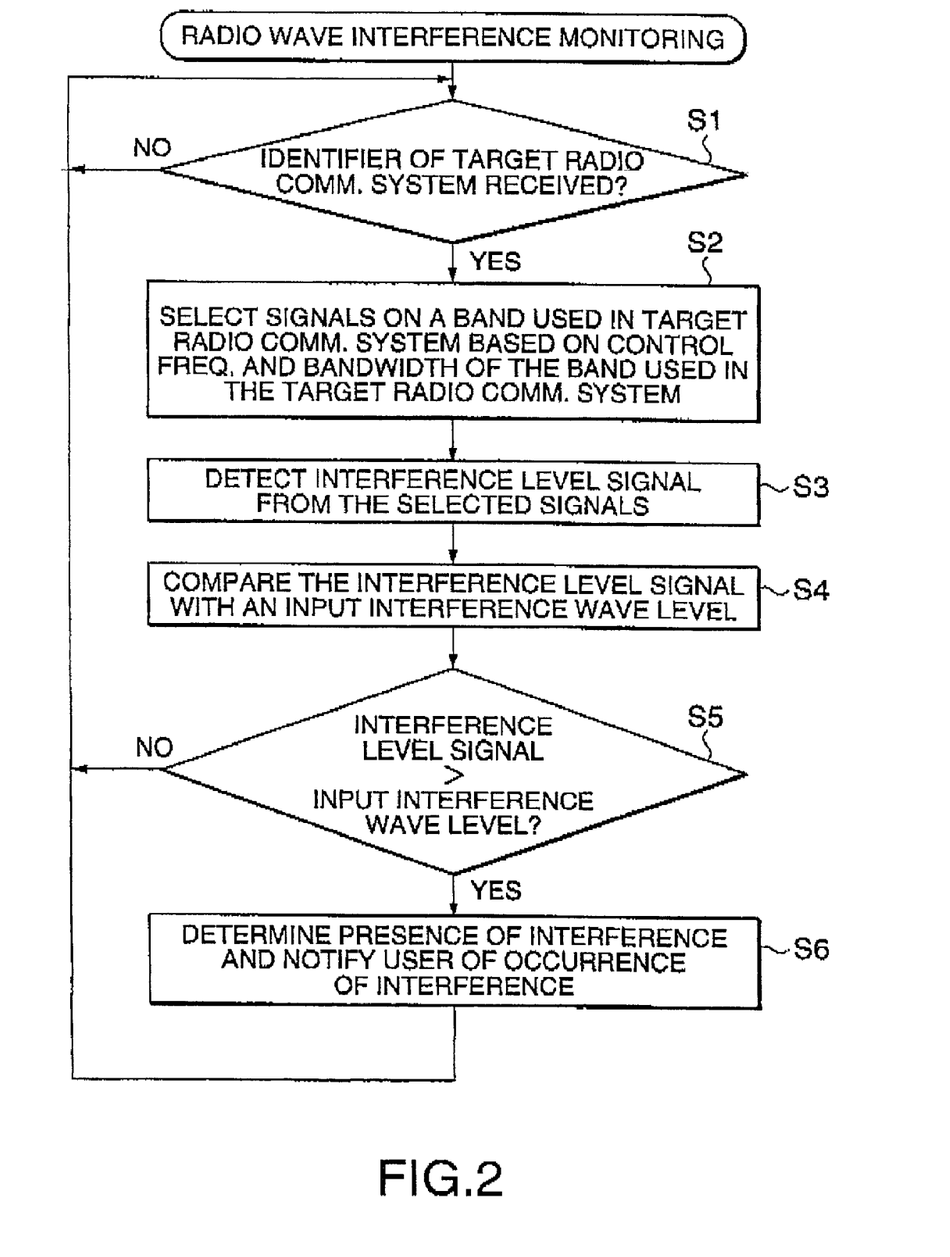
FIG. 2 if a flow chart showing an interference monitoring method employed in the alert generating device according to the first embodiment of the present invention.

Referring to FIG. 2, it is determined whether identifier information for identifying a target radio communication system is inputted at the input terminal 11 (step S1). The identifier information includes three items of information as follows: 1) Center frequency of a frequency band used by the target radio communication system, 2) Band width of the frequency band, and 3) Interference level affecting the target radio communication system. Alternatively, the alerting device 1 inputs only an identifier for identifying a target radio communication system and convert it to the above three items of information.

When the identifier information is inputted (YES in step S1), the information of center frequency Fc and bandwidth W are output to the band selector 2 and the interference level LI is output to the interference decision section 4.

The band selector 2 inputs received radio signals from the antenna 10 and selects a radio signal on a band including a target band used by the target radio communication system depending on the information of center frequency Fc and bandwidth W that are inputted through the input terminal 11 (step S2). The received signal selected by the band selector 2 is output to the interference detector 3.

The interference detector 3 detects an interference level from the received signal to output it as an interference level signal to the interference decision section 4 (step S3).

The interference decision section 4 inputs the detected interference level signal from the interference detector 3 and the interference level LI from the input terminal 11. The interference decision section 4 compares them to determine which is greater (steps S4 and S5).

When the detected interference level signal is greater than the interference level LI (YES in step S5), it is determined that interference occurs and the interference decision section 4 outputs an interference occurrence signal to the interference indicator 5 (step S6).

When receiving the interference occurrence signal from the interference decision section 4, the interference indicator 5 notifies a user of occurrence oh interference by appropriate means, for example, sound, light, vibration or the like.

The alerting device 1 according to the present embodiment is integrated with a radio transceiver for the target radio communication system. For this, the alerting device 1 is provided with the baseband transceiver 6, the radio-frequency transmitter 7, the transmitting antenna 12, and the input/output terminal 13.

Since the signals selected by the band selector 2 include signals on the band used by the target radio communication system, it is possible to perform a receiving operation of the transceiver by the baseband transceiver 6 demodulating the received signal to produce a baseband received signal, which is output to the input/output terminal 13. A transmission operation of the transceiver can be performed by the baseband transceiver 6 modulating a transmission signal inputted through the input/output terminal 13 to produce a high-frequency transmission signal, which is transmitted by the RF transmitter 7 through the transmitting antenna 12.

1.2) Band Selector

Figure 3:
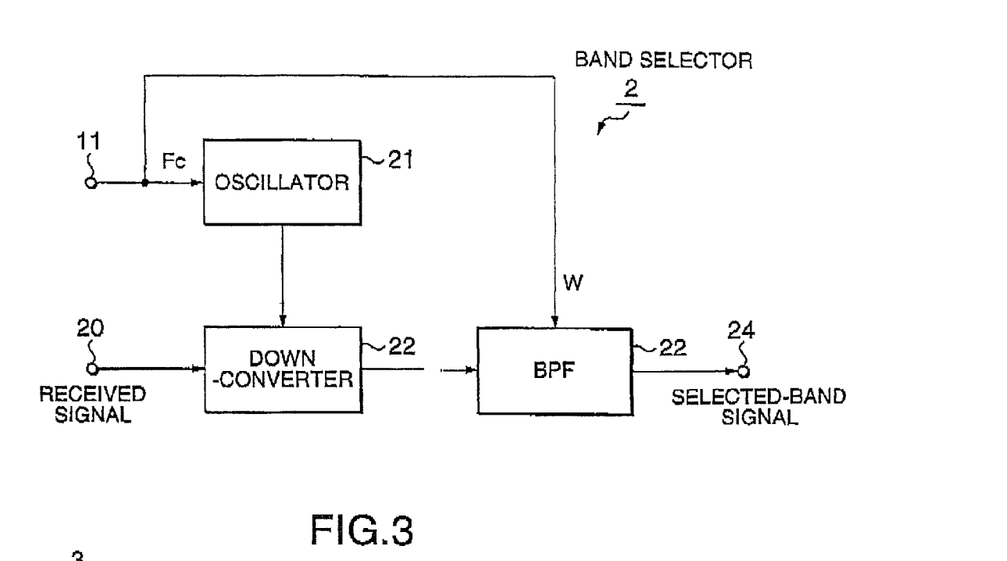
FIG. 3 is a block diagram showing the circuit of a band selector in the first embodiment of the present invention.

Referring to FIG. 3, the band selector 2 is composed of an oscillator 21, a down converter 22, and a band-pass filter 23. The band selector 2 inputs received radio signals from an input terminal 20 connected to the receiving antenna 10. An oscillation frequency of the oscillator 21 and a passing frequency band of the band-pass filter 23 are controlled depending on respective ones of the center frequency Fc and bandwidth W determined by the identifier information inputted through the input terminal 11.

Accordingly, the received radio signals are converted into intermediate-frequency signals by the down converter 22 and then the intermediate-frequency signals are restricted by the band-pass filter 23 into signals on a controlled band and bandwidth that are used in the target radio communication system. At the same time, noise and other interference components can be filtered out by the band pass filter 23. The received signal in this way is output to the interference detector 3 and the baseband transceiver 6 through an output terminal 24.

1.3) Interference Detection and Decision

Figure 4:
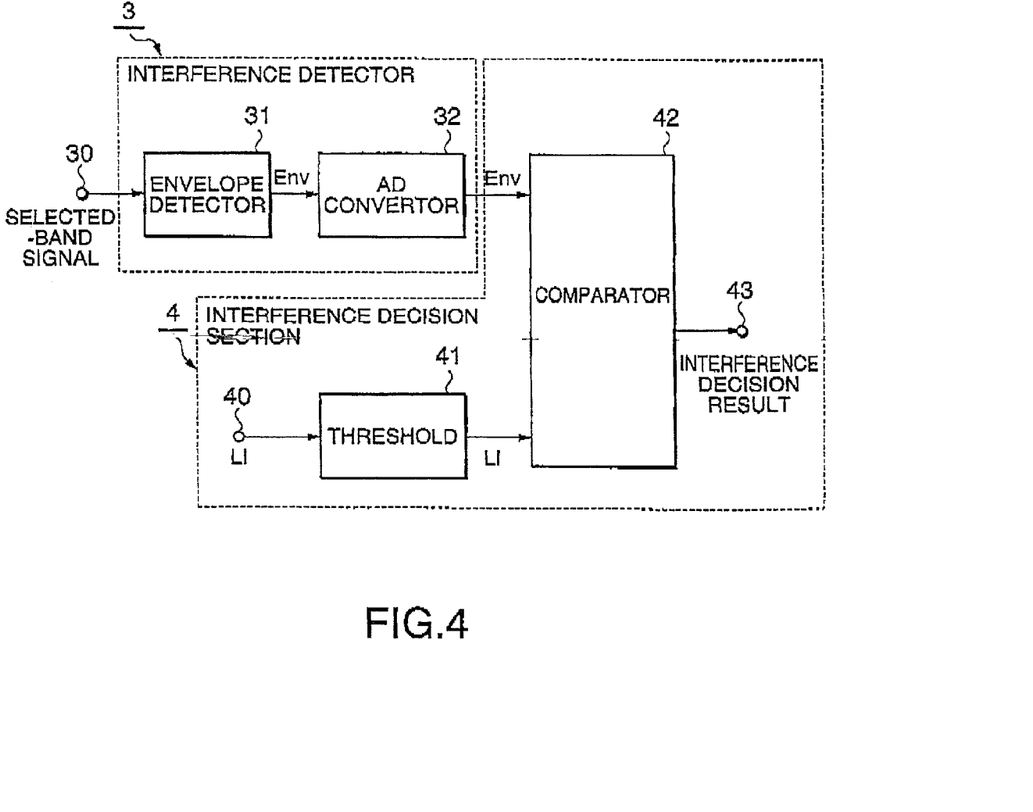
FIG. 4 is a block diagram showing a circuit including an interference detector and an interference decision circuit in the first embodiment of the present invention.

Referring to FIG. 4, the interference detector 3 is composed of an envelope detector 31, and an analog-to-digital converter 32. The interference decision section 4 is composed of a threshold memory 41 and a comparator 42.

The envelope detector 31 inputs the selected signal from the band selector 2 through an input terminal 30 and detects an envelope thereof. For example, a log amplifier may be used as the envelope detector 31. The detected envelope Env is converted into digital by the AD converter 32 and is then output to the comparator 42 of the interference decision section 4.

The interference decision section 4 inputs the interference level LI from the input terminal 11 and stores it in the threshold memory 41. The comparator 42 compares the detected envelope Env inputted from the AD converter 32 of the interference detector 3 with the interference level LI stored in the threshold memory 41. When Env>LI, it is determined that interference occurs and the comparator 42 outputs an interference occurrence signal to the interference indicator through an output terminal 43.

Second Embodiment

According to a second embodiment of the present invention, an alerting device 100 can notify users of not only occurrence of interference but also source of interference. The details of the second embodiment will be described hereinafter.

Figure 5:
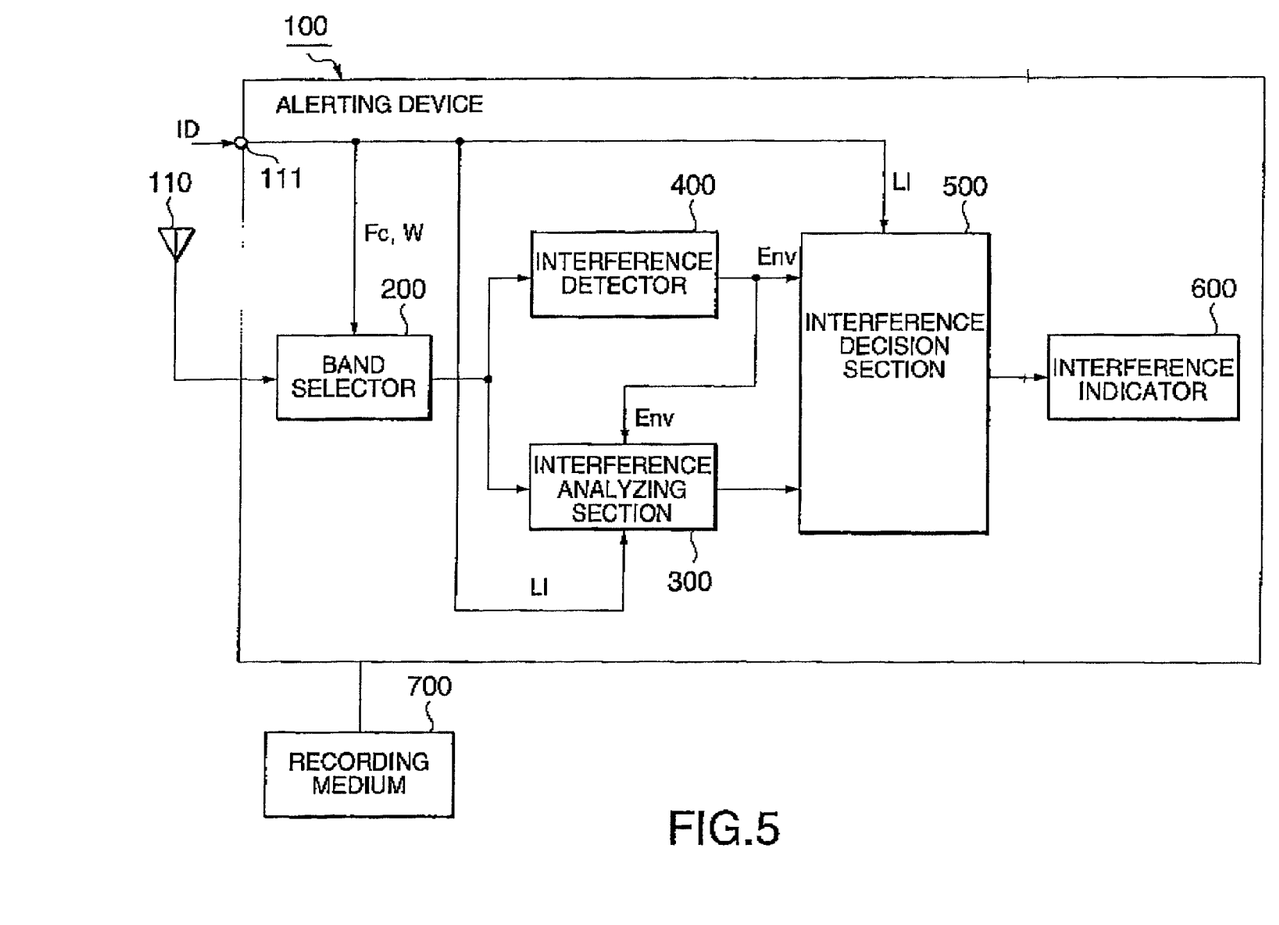
FIG. 5 is a block diagram showing an alert generating device according to a second embodiment of the present invention.

Referring to FIG. 5, the alerting device 100 includes a receiving antenna 110, an input terminal 111, a band selector 200, an interference analyzing section 300, an interference detector 400, an interference decision section 500, and an interference indicator 600.

In FIG. 5, the receiving antenna 110, the input terminal 111, the band selector 200, and the interference detector 400 have the same functions as those of the first embodiment as shown in FIG. 1 and therefore the details thereof will be omitted.

As in the case of the first embodiment, it is possible to integrate the above functions with a radio transceiver for the target radio communication system.

The above functions of the alerting device 100 may be implemented with hardware or software. A program-controlled processor (not shown) may be provided in the alerting device 100 to implement the above functions and perform the interference monitoring and alert generating operations by running corresponding programs that are previously stored in the recording medium 700. Hereafter, the interference monitoring and alert generating operations will be described with reference to FIG. 6.

2.1) Operation

Figure 6:
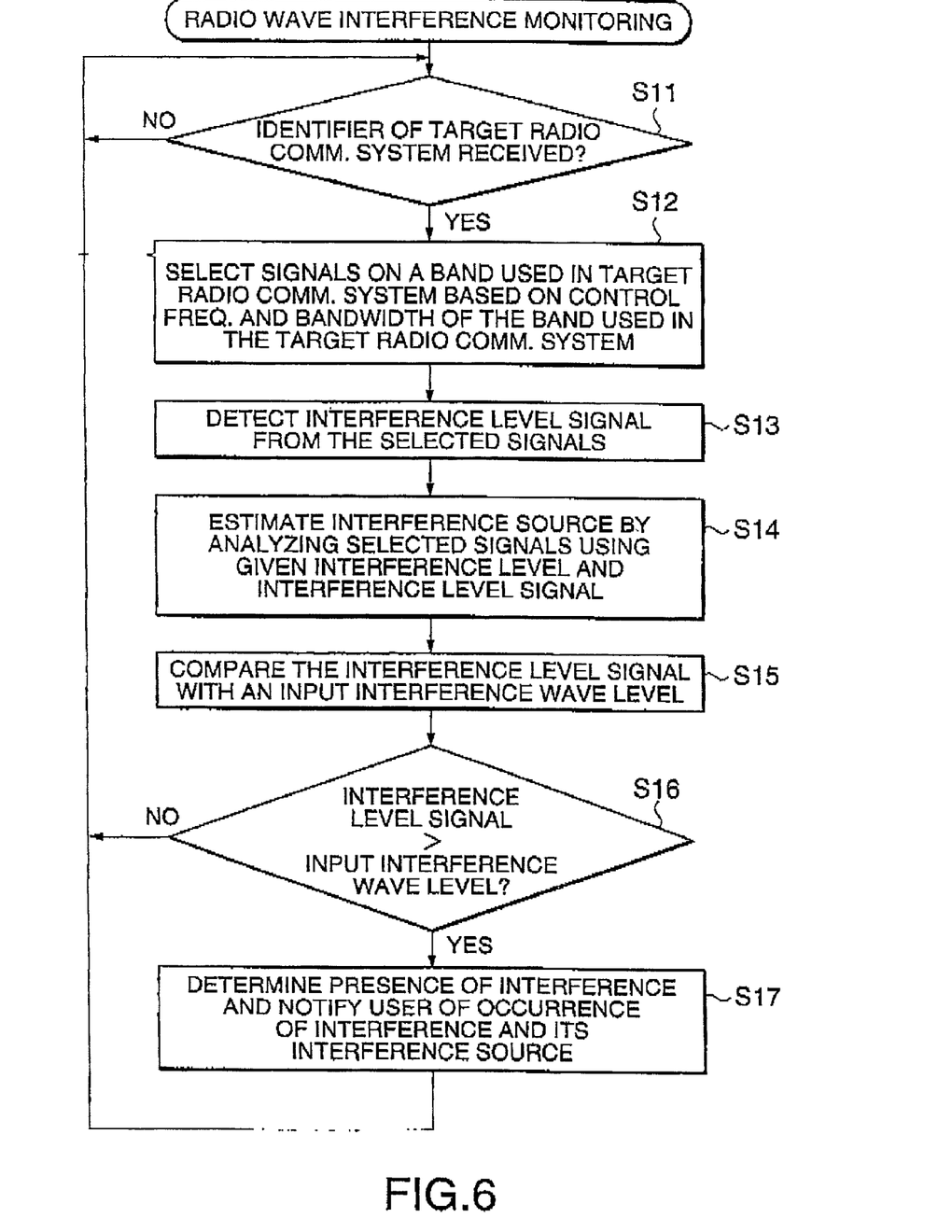
FIG. 6 is A flow chart showing an interference monitoring method employed in the alert generating device according to the second embodiment of the present invention.

In FIG. 6, steps S11–S13 are the same as the steps S1–S3 of FIG. 2. Briefly, it is determined whether identifier information for identifying a target radio communication system is inputted at the input terminal 111 (step S11). The identifier information includes three items of information as follows: 1) Center frequency of a frequency band used by the target radio communication system, 2) Band width of the frequency band, and 3) Interference level affecting the target radio communication system. When the identifier information is inputted (YES in step S11), the information of center frequency FC and bandwidth W are output to the band selector 200 and the interference level LI is output to the interference analyzing section 300 and the interference decision section 500.

The band selector 200 inputs radio signals from the antenna 110 and selects signals including signals on a target band used by the target radio communication system depending on the information of center frequency Fc and bandwidth W that are inputted through the input terminal 111 (step S12). The received signal is output to the interference analyzing section 300 and the interference detector 400.

The interference detector 400 detects an interference level from the received signal to output it as an interference level signal to the interference analyzing section 300 and the interference decision section 500 (step 313).

The interference analyzing section 300 analyzes the received signal inputted from the band selector 200 using interference level L1 inputted from the input terminal 111 and the interference level signal inputted from the interference detector 400 to estimate a source of interference (step S14) The estimation result is output to the interference decision section 500.

The interference decision section 500 inputs the detected interference level signal from the interference detector 400, the estimation result from the interference analyzing section 300, and the interference level LI from the input terminal 111. The interference decision section 500 compares the detected interference level signal with the interference level LI to determine whether interference occurs (steps S15 and S16) When the detected interference level signal is greater than the interference level LI (YES in step S16), it is determined that interference occurs, and the interference decision section 500 outputs an interference occurrence signal to the interference indicator 600. In addition, the interference decision section 500 outputs interference source information to the interference indicator 600 based on the estimation result inputted from the interference analyzing section 300 (step 317).

When receiving the interference occurrence signal and the interference source information from the interference decision section 500, the interference indicator 600 notifies a user of not only occurrence of interference but also its interference source by appropriate means, for example, sound, light, vibration or the like.

2.2) Interference Analysis

Figure 7:
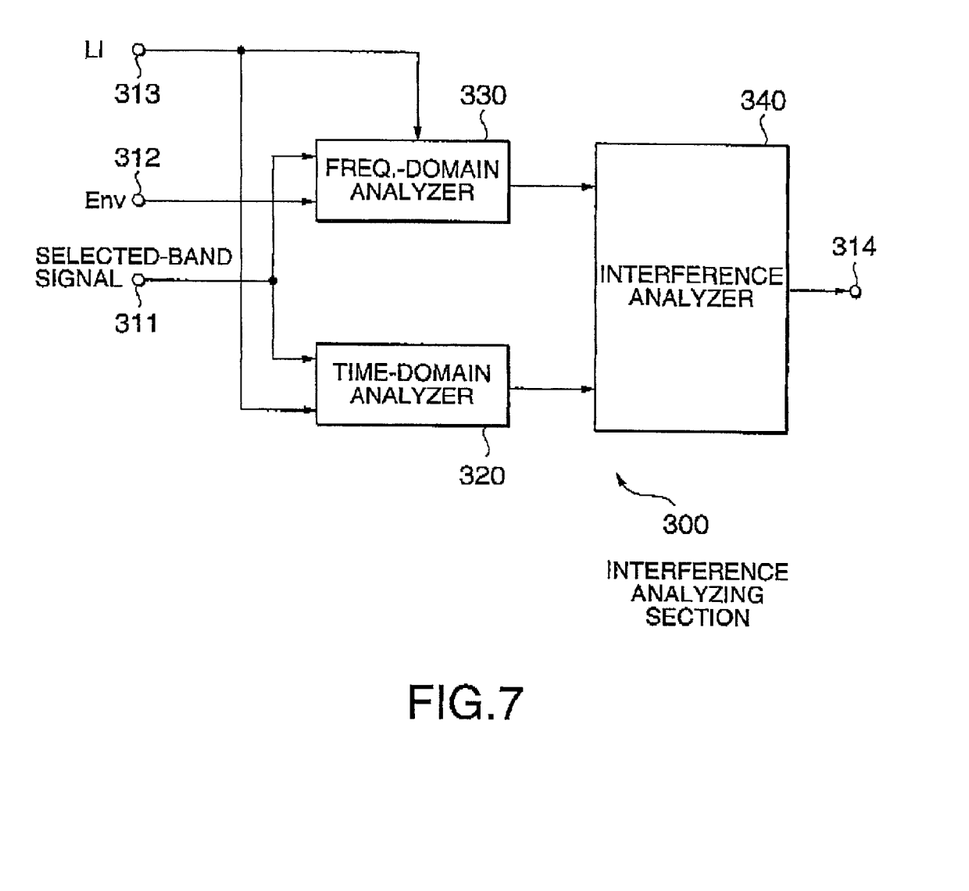
FIG. 7 is a block diagram showing the circuit of an interference analyzing section in the second embodiment as shown in FIG. 5.

Referring to FIG. 7, the interference analyzing section 300 includes a time-domain analyzer 320 a frequency-domain analyzer 330, and an interference analyzer 340.

The received signal is inputted from the band selector 200 through an input terminal 311 and are transferred to both the time-domain analyzer 320 and the frequency-domain analyzer 330. The interference level signal is inputted from the interference detector 400 through an input terminal 312 and is transferred to the frequency-domain analyzer 330. The interference level LI is inputted from the input terminal 111 through an input terminal 313 and is transferred to both the time-domain analyzer320 and the frequency-domain analyzer 330.

Based on these signals, the time-domain analyzer 320 and the frequency-domain analyzer 330 analyze the received signal to produce a duration of interference and a frequency spectrum thereof. These analysis results are output to the interference analyzer 340.

The interference analyzer 340 estimates an interference source based on the time-domain analysis result and the frequency-domain analysis result and outputs the estimation result to the interference decision section 500 through an output terminal 314.

2.2.1) Time-domain Analyzer

Figure 8:
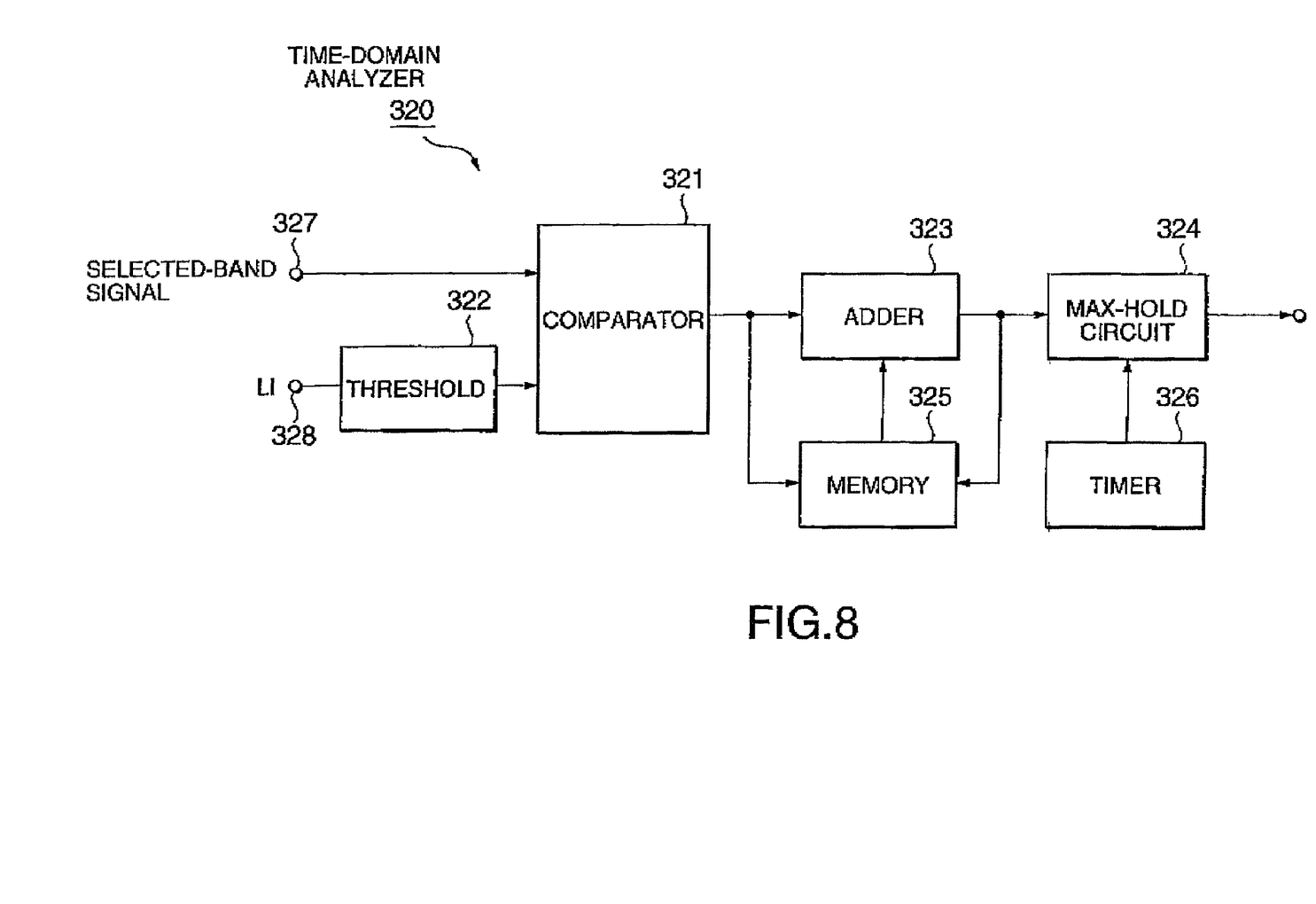
FIG. 8 is a block diagram showing the circuit of a time-domain analyzer as shown in FIG. 7.

Referring to FIG. 8, the time-domain analyzer 320 includes a comparator 321, a threshold memory 322, an adder 323, a maximum-value holding (max-hold) circuit 324, a memory 325, and a timer 326.

Interference level signals are inputted from the interference detector 400 through an input terminal 327 and sequentially enter the comparator 321. The interference level LI is inputted from the input terminal 111 through an input terminal 328 and is stored as a threshold value in the threshold memory 322.

The comparator 321 sequentially compares the interference level signals with the interference level LI stored in the threshold memory 322. When an interference level signal is greater than the interference level LI, the comparator 321 sets its output to 1. When the interference level signal is not greater than the interference level LI, the comparator 321 sets its output to 0.

The adder 323 adds the comparison output of the comparator 321 to a currently held value. stored in the memory 325 and the resultant value is stored in the memory 325 again. In other words, a currently held value of the memory 325 is incremented when the comparator 321 outputs 1. When the comparator 321 output 0, the memory 325 is reset to 0. Accordingly, the output of the adder 323 indicates the number of times the comparator 321 has successively outputted 1.

The output of the adder 323 is held in the max-hold circuit 324, which holds the maximum number of times the comparator 321 has successively outputted 1. The timer 326 is set for a predetermined measurement time period. When time-out occurs, the value held in the max-hold circuit 324 is output as a time domain analysis result to the interference analyzer 340 through an output terminal 329. Accordingly, the time-domain analysis result indicates a maximum time length during which the detected interference level signal exceeds the threshold value (interference level LI). In the words, the time-domain analysis result indicates a duration of interference.

2.2.2) Frequency-domain Analyzer

Figure 9:
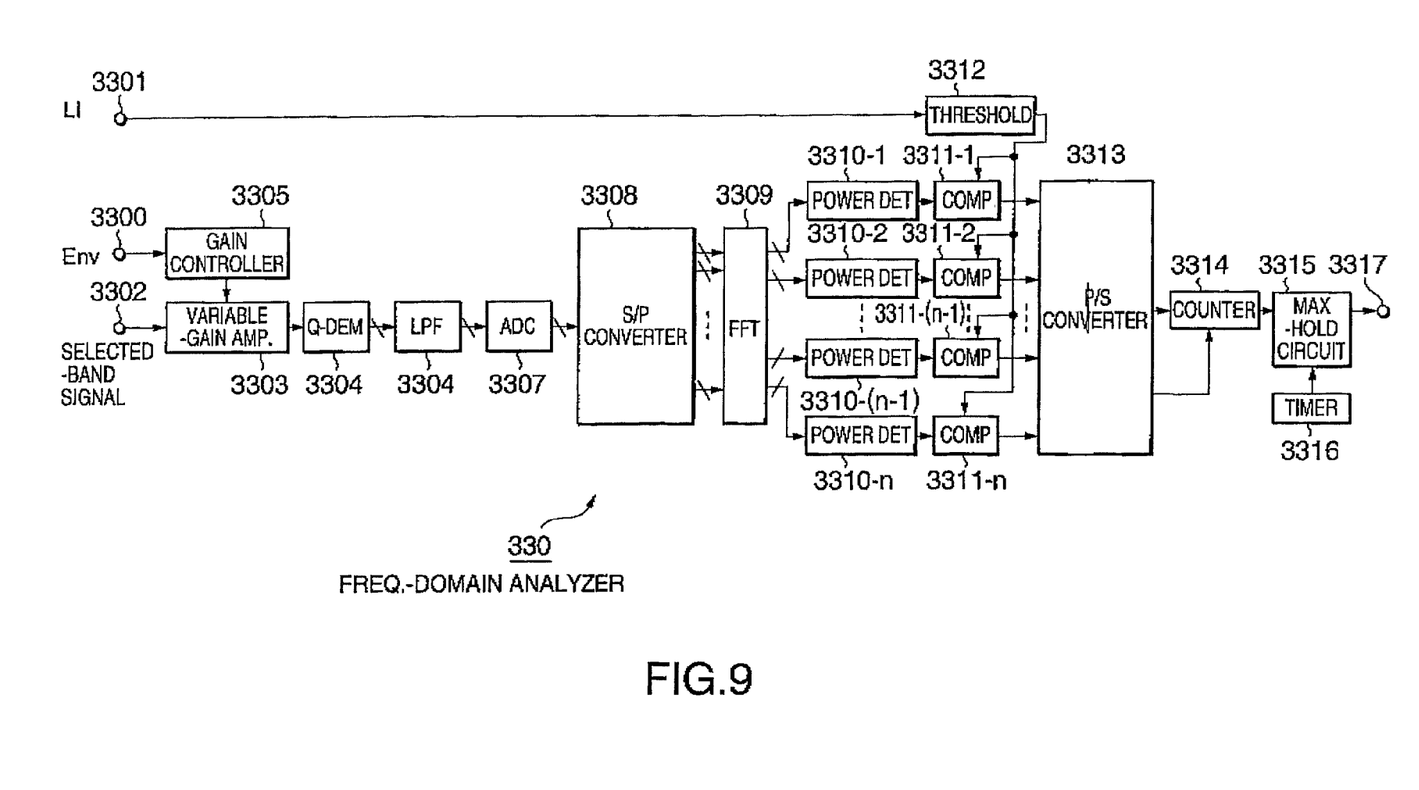
FIG. 9 is a block diagram showing the circuit of a frequency-domain analyzer as shown in FIG. 7.

Referring to FIG. 9, the frequency-domain analyzer 330 has an input terminal 3301 for inputting the interference level LI from the input terminal 111, an input terminal 3300 for inputting a detected interference signal from the interference detector 400, and an input terminal 3302 for inputting a received signal from the band selector 200.

The interference level LI is inputted through the input terminal 3301 and is stored as a threshold value in the threshold memory 3312. The detected interference signal inputted through the input terminal 3300 enters a gain controller 3305, which controls the gain of a variable-gain amplifier 3303. The variable-gain amplifier 3303 amplifies the received signal with a controlled gain. In other words, the received signal is adjusted to an appropriate level based on the interference level signal detected by the interference detector 400.

The received signal amplified by the variable-gain amplifier 3303 is quadrature-demodulated into a demodulated signal composed of I and Q-components by a quadrature demodulator 3304. The quadrature demodulator 3304 outputs the demodulated signal composed of I- and Q-components (denoted by a slashed signal line in FIG. 9) to a low-pass filter 3306. The low-pass filter 3306 filters out components of double the frequency of the demodulated signal. The demodulated signal passing through the low-pass filter 3306 is converted to a digital signal by an analog-to-digital converter 3307. The digital signal is outputted to a serial-to-parallel (S/P) converter 3308, where the digital signal is converted every n serial signals to n parallel signals. The n parallel signals are output to a Fast-Fourier Transform circuit (FFT) 3309.

The FFT 3309 performs FFT computation for n points to produce n frequency components included in the n serial signals which are output to a corresponding one of n power detectors 3310-1 through 3310-n. The detected power for each signal is output to a corresponding one of comparators 3311-1 through 3311-n, where the detected power is compared with the threshold value (the interference level LI) stored in the memory 3312.

A comparator 3311-i (i-1, 2, . . . , n) outputs 1 when a corresponding detected power is greater than the interference level LI and outputs 0 otherwise. Then output values each being 1 or 0 of the comparators 3311-1 through 3311-n are converted to n serial values by a parallel-to-serial converter 3313, for example, such that the n output values are sorted in ascending order of frequency.

The parallel-to-serial converter 3313 outputs a reset signal to a counter 3314 before outputting the n serial values. The counter 3314 is incremented when inputting "1" and is reset when inputting "0". The count value of the counter 3314 is outputted to a max-hold circuit 3315. Such an arrangement causes the max-hold circuit 3315 to hold a value indicating the number of consecutive bands having components exceeding the interference level LI. In other words, this value is equal to a maximum frequency bandwidth causing interference.

A timer 3316 is set for a predetermined measurement time period. When a time-out occurs, the value held in the max-hold circuit 3315 is output as a frequency-domain analysis result to the interference analyzer 340 through an output terminal 3317 (see FIG. 7).

2.2.3) Interference Analyzer

Figure 10:
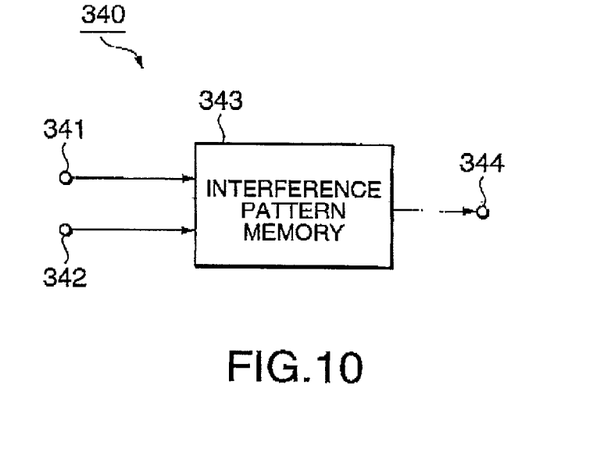
FIG. 10 is a block diagram showing the circuit of the interference analyzer as shown in FIG. 7.

Referring to FIG. 10, the interference analyzer 340 may be composed of an interference pattern memory 343, The interference pattern memory 343 inputs time-domain and frequency-domain analysis results from the time-domain and frequency-domain analyzers 320 and 330 through input terminals 341 and 342, respectively.

More specifically, the interference pattern memory 343 retrievably stores data of interference sources generating interference patterns, each of which is identified by a pair of time-domain and frequency-domain analysis results inputted from the time-domain and frequency-domain analyzers 320 and 330. Accordingly, the time-domain and frequency-domain analysis results cab be used as an access address of the interference pattern memory 343 to estimate an interference source radiating that interference. An example of the data stored in the interference pattern memory 343 is shown in FIG. 11.

Figure 11:
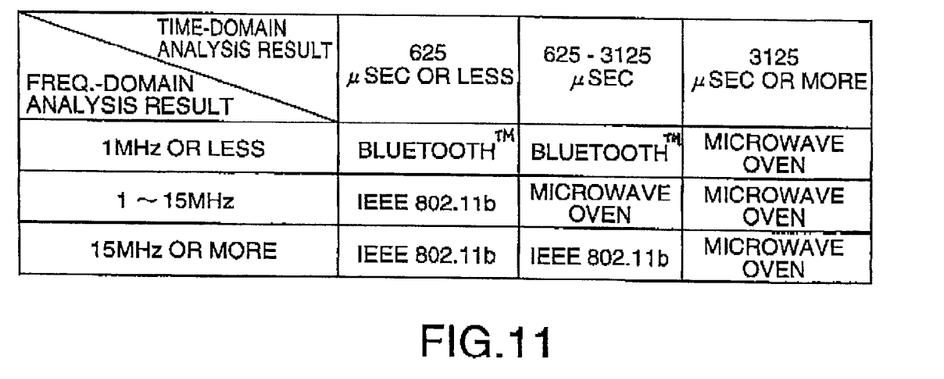
FIG. 11 is a diagram showing an example of contents stored in an interference pattern memory as shown in FIG. 10.

As shown in FIG. 11, the interference pattern memory 343 stores a table containing data of interference sources such as wireless LAN conforming to IEEE802.11b, Bluetooth™, and typical home-use microwave oven. The- rows of the table are labeled with frequency bandwidths in ascending order obtained by the frequency-domain analysis result and the columns are labeled with durations in ascending order obtained by the time-domain analysis result. Therefore, by inputting a pair of time-domain and frequency-domain analysis results, an interference source radiating the interference in question can be estimated.

For example, when the time-domain analysis result indicates that a duration of interference is 1000 μsec and the frequency-domain analysis result indicates that a frequency bandwidth is 8 MHz, the interference source is estimated to be "microwave oven".

2.3) Interference Decision

Figure 12:
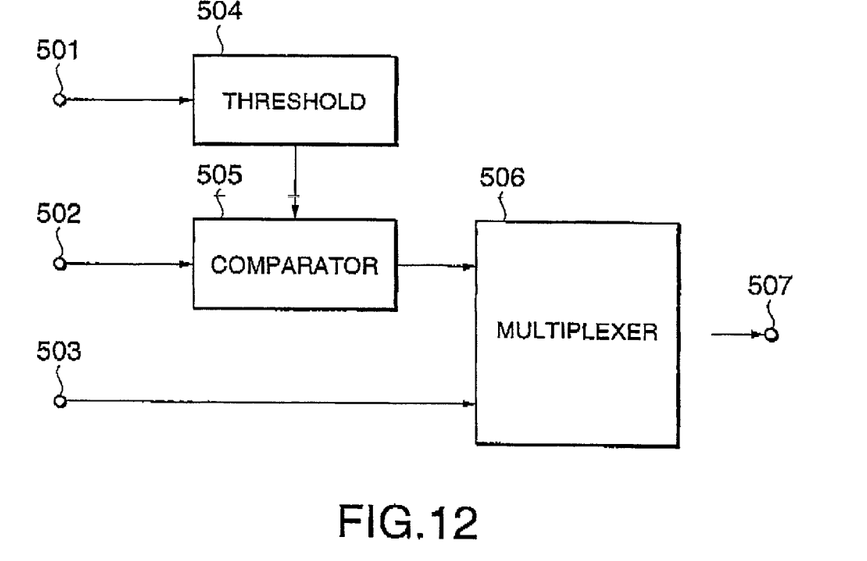
FIG. 12 is a block diagram showing the circuit of the interference decision circuit as shown in FIG. 5.

Referring to FIG. 12, the interference decision section 500 includes a threshold memory 504, a comparator 505, and a multiplexer 506. The interference level LI is inputted through an input terminal 501 and is stored as a threshold level in the threshold memory 504. The detected interference level signal inputted from the interference detector 400 through an input terminal 502 enters the comparator 505.

The comparator 505 compares the detected interference level signal with the threshold level (interference level LI) stored in the memory 504. When the detected interference level signal is greater than the threshold level (interference level LI), it is determined that interference occurs and the comparator 505 output 1 to the multiplexer 506. When the detected interference level signal is not greater than the threshold level (interference level LI), it is determined that no interference occurs and the comparator 505 output 0 to the multiplexer 506.

The multiplexer 506 inputs the comparison result form the comparator 505 and the interference source estimation result from the interference analyzing section 300 through an input terminal 503. The multiplexer 506 multiplexes the comparison result and the interference source estimation result to output it to the interference indicator 600.

Examples of Interference Source

Figure 13:
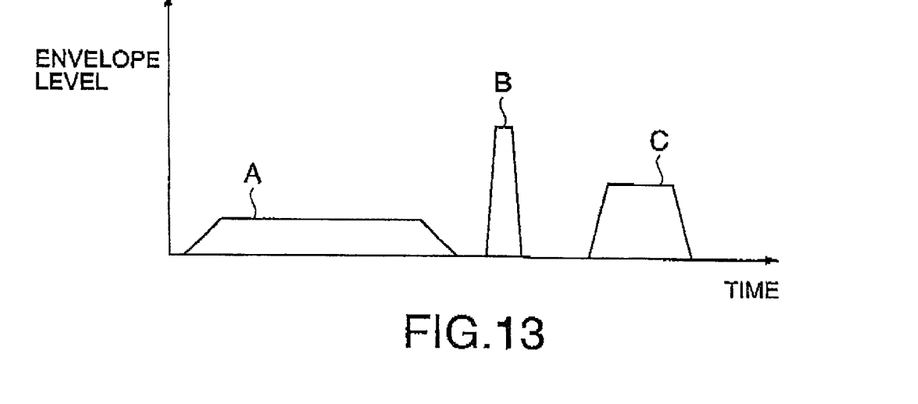
FIG. 13 is a diagram showing time-varying envelope levels of radiating electromagnetic waves in wireless LAN conforming to IEEE802.11b, Bluetooth™, and microwave oven.

Referring to FIG. 13, A indicates an envelope of a signal radiated by microwave oven, B by Bluetooth™-compliant device, and C by IEEE802.11b-compliant device.

Envelope level patterns of radiated signals vary by electronic equipment. A signal envelope of a signal radiated by ordinary home-use microwave oven is a pulse-like signal having a width of approximately 20 msec, as indicated in Ad Kamerman, Nedim Erkocevic, "Microwave Oven Interference on Wireless LANs Operating in the 2.4 GHz ISM Band" (IEEE, Personal, Indoor and Mobile Communications, 1997. Waves of the year 2000, PIMRC'97., The 8th IEEE International Symposium on, Volume:3, 1997).

As for Bluetooth™, a signal envelope of a radiated signal varies depending on a length of data to be transmitted. In the case of 1500-byte data, its signal envelope is a pulse-like signal having a width of approximately 1 msec.

In the case of IEEE802.11b, the length of a transmission signal is defined to be one of 625 μsec, 625×3 (μsec) and 625 ×5 (μsec). Accordingly, its envelope of a radiated signal is a pulse-like signal having a width of one of these.

Figure 14:
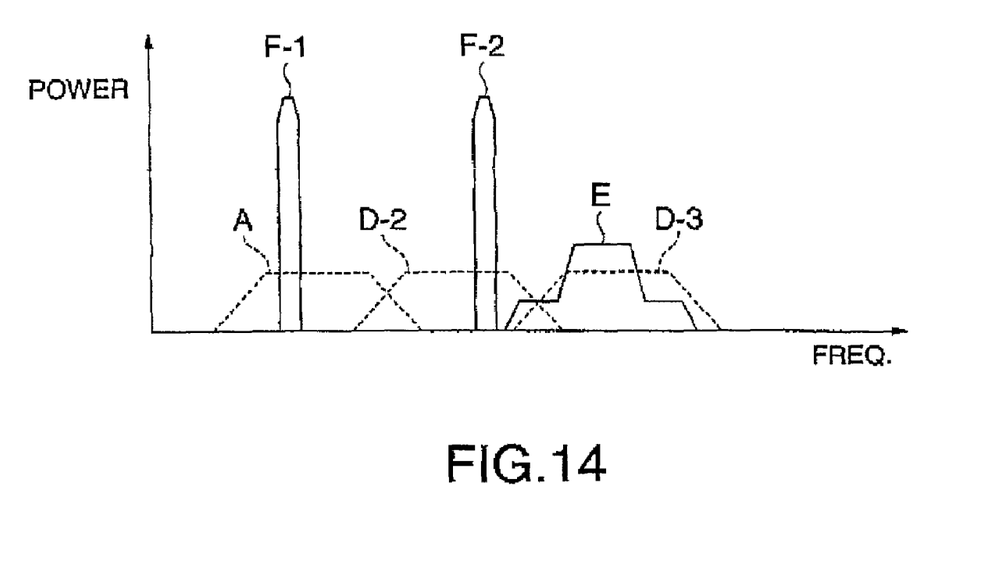
FIG. 14 is a spectrum diagram of radio-frequency signals generated by wireless LAN conforming to IEEE802.11b, Bluetooth™, and electromagnetic waves radiating from microwave oven.

Referring to FIG. 14, D-1, D-2 and D-3 indicate an example of spectrums on three ones of fourteen channels defined in IEEE 802.11b, F-1 and F-2 are an example of spectrums in Bluetooth™, and E is an example of spectrum of a signal radiated by a microwave oven.

A spectrum of IEE802.11b has a bandwidth of 20 MHz per channel, a spectrum of Bluetooth™ has a bandwidth of 1 MHz per channel, and a spectrum of home-use microwave oven has a bandwidth of the order of 15 MHz.

Accordingly, it is possible to estimate an interference source by analyzing a frequency band used by a target communication system with respect to pulse length on time axis and spectrum on frequency axis. For example, when a microwave oven is estimated to be an interference source, it is easy for a user in an ordinary household to take an appropriate step, for example, to stop usage of the microwave oven. In this manner, the alerting device according to the present invention allows easy detection of interference in a radio communication system and can suggest what to do so as to avoid deterioration in communication quality cause by interference.

The invention claimed is:

1. An alerting device for alerting a user to occurrence of interference on a band used in a wireless communication system, comprising:
   an input terminal accepting an input of system identifying information for identifying a wireless communication system;
   a determiner for determining whether an interference source exists, within a selected signal band used by the wireless communication system, the determining being based on the system identifying information input to the input terminal identifying the wireless communication system; and
   an indicator for indicating that interference occurs on the selected signal band when it is determined that the interference source exists,
   the selected signal band used for signal reception by the wireless communication system being determined from the system identifying information input at the input terminal.

2. The alerting device according to claim 1, wherein, the determiner comprises an interference detector for determining the selected band and detecting occurrence of interference based on interference information included in the system identifying information, and
   the interference information comprises information of
   1) a center frequency of a frequency band used by the wireless communication system, and
   2) a band width of the frequency band.

3. The alerting device according to claim 2, wherein the determiner further comprises:
   an estimator for identifying an interference source from a received signal when the occurrence of interference is detected.

4. The alerting device according to claim 1, wherein the system identifying information includes a carrier frequency of the wireless communication system, a bandwidth thereof, and a threshold value used to determine whether a good communication can be made, the carrier frequency and bandwidth being used to select the selected signal band.

5. The alerting device according to claim 1, wherein the determiner comprises:
   an envelope level detector for detecting an envelope level of a received signal; and
   a comparator for comparing the detected envelope level with a prescribed interference level obtained from the system identifying information to determine whether interference occurs.

6. The alerting device according to claim 5, wherein the determiner further comprises:
   an estimator for determining an interference source from a received signal when the occurrence of interference is detected.

7. An alerting device for alerting a user to occurrence of interference on a band used in a wireless communication system, comprising:
   an input terminal accepting an input of system identifying information for identifying a wireless communication system;
   a determiner for determining whether an interference source exists, within a selected signal band used by the wireless communication system, based on the system identifying information input to the input terminal identifying the wireless communication system; and
   an indicator for indicating that interference occurs on the band when it is determined that the interference source exists,
   the selected signal band being determined from the system identifying information,
   wherein, the determiner comprises:
   an envelope level detector for detecting an envelope level of a received signal; and
   a comparator for comparing the detected envelope level with a prescribed interference level obtained from the system identifying information to determine whether interference occurs,
   an estimator for determining an interference source from a received signal when the occurrence of interference is detected, and
   wherein the estimator comprises:
   a memory retrievably storing data characterizing each of a plurality of interference sources so that the estimator can determine the interference source by comparison of characteristics of the received signal, within a selected frequency band, with the memory-stored data;
   an analyzer for analyzing the received signal to produce a duration of the interference and frequency components of the received signal when the interference occurs; and
   a retriever for retrieving an interference source from the memory according to a comparison of stored data with the duration and the frequency components obtained by the analyzer, the retrieved interference source being identified as the determined interference source.

8. An alerting device for alerting a user to occurrence of interference in a radio communication system, comprising:
   a signal extractor for extracting an interference component from a selected frequency band of a received signal based on system identifying information prescribed in the radio communication system;
   an interference detector for detecting whether the interference component deteriorates quality of communication based on a comparison of characteristics of the interference component to the system identifying information, to produce an interference detection signal; and
   an indicator for notifying a user of occurrence of interference when the interference detection signal indicates deteriorated quality of communication,
   the system identifying information comprising information of
   1) a center frequency of a frequency band used by the wireless communication system;
   2) a band width of the frequency band; and
   3) an interference level adversely affecting the wireless communication system, wherein,
   the selected band is based on the center frequency and the band width information,
   the interference detector comprises a reception band selector and an interference decision section,
   the center frequency and bandwidth information are provided to the reception band selector to set the reception band selector to the selected band, and
   the interference level information is provided to the interference decision section.

9. An alerting method for alerting a user to occurrence of interference on a band used in a wireless communication system, comprising the steps of:
   determining whether an interference source exists within a selected band, based on system identifying information prescribed in the wireless communication system; and
   indicating that interference occurs on the selected band when it is determined that the interference source exists,
   wherein the system identifying information comprises information of a carrier frequency of the wireless communication system and a bandwidth thereof, an interference level affecting the wireless communication system, and the selected band is based on the carrier frequency and the band width information, wherein,
   the determining steps comprises a reception band selection and an interference decision, the center frequency and bandwidth information being used to set the reception band selection to the selected band, and the interference level information being provided to make the interference decision.

10. The alerting method according to claim 9, wherein the determining step comprises the step of:
    detecting occurrence of interference based on interference information included in the system identifying information.

11. The alerting method according to claim 10, further comprising the step of:
    identifying the interference source from a received signal when the occurrence of interference is detected.

12. The alerting method according to claim 9, wherein the system identifying information further includes a threshold value used to determine whether a good communication can be made.

13. The device of claim 1, wherein the identifying information comprises information of:
    1) a center frequency of a frequency band used by the wireless communication system,
    2) a band width of the frequency band, and
    3) an interference level affecting the wireless communication system, and
    the selected band is based on the center frequency and the band width information.

14. The device of claim 13, wherein the input terminal accepts the input of an identifier, identifying the wireless communication system, as the identifying information and converts the identifier into i) the center frequency of the frequency band used by the wireless communication system; ii) the band width of the frequency band; and iii) the interference level affecting the wireless communication system.

15. The device of claim 13, wherein the center frequency of the frequency band is 2.4 GHz.

16. An alerting device for alerting a user to occurrence of interference on a band used in a wireless communication system, comprising:
    an input terminal accepting an input of system identifying information for identifying a wireless communication system;
    a determiner for determining whether an interference source exists, within a selected signal band used by the wireless communication system, based on the system identifying information input to the input terminal identifying the wireless communication system; and
    an indicator for indicating that interference occurs on the band when it is determined that the interference source exists,
    the selected signal band being determined from the system identifying information, wherein,
    the identifying information comprises information of:
    1) a center frequency of a frequency band used by the wireless communication system,
    2) a band width of the frequency band, and
    3) an interference level affecting the wireless communication system, and
    the selected band is based on the center frequency and the band width information,
    the determiner comprises a reception band selector and an interference decision section,
    the center frequency and bandwidth information are provided to the band selector to set the reception band selector to the selected band, and
    the interference level information is provided to the interference decision section.

* * * * *